L. A. DEGGINGER.
EGG CARRIER.
APPLICATION FILED DEC. 26, 1914.
1,144,111.
Patented June 22, 1915.
2 SHEETS—SHEET 2.
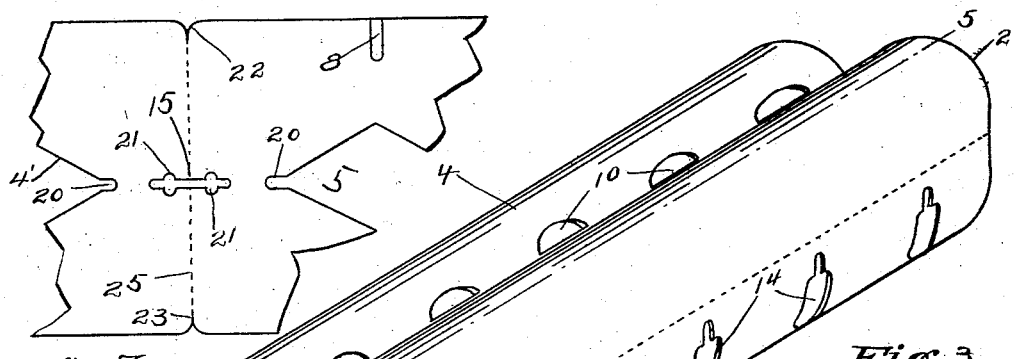
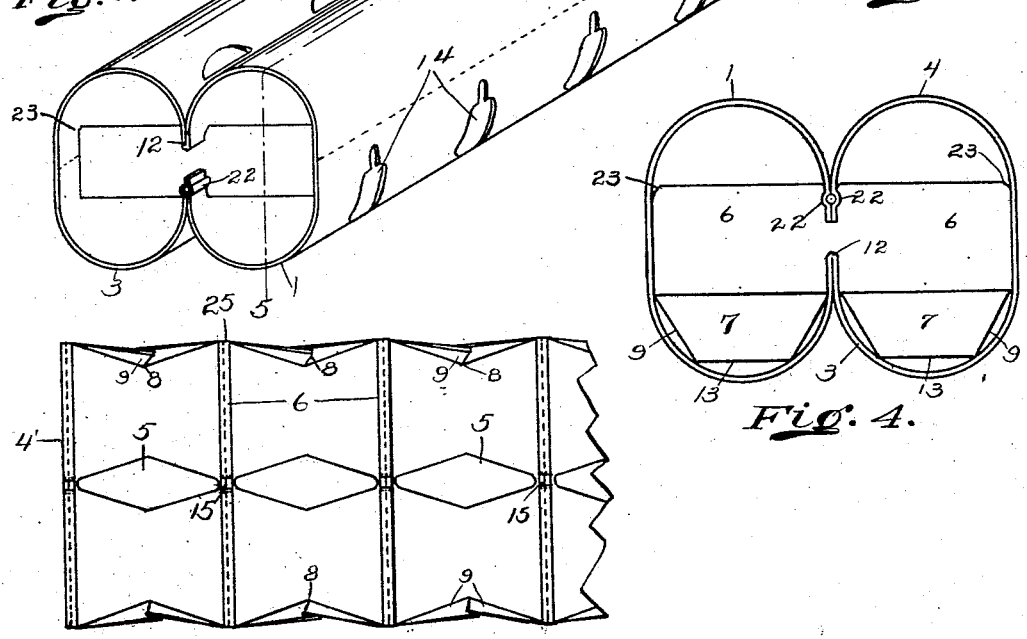
Witnesses
L. M. Dunlap
George H. Ricks
Inventor
Louis A. Degginger
By John W. Frehl
Attorney

UNITED STATES PATENT OFFICE.

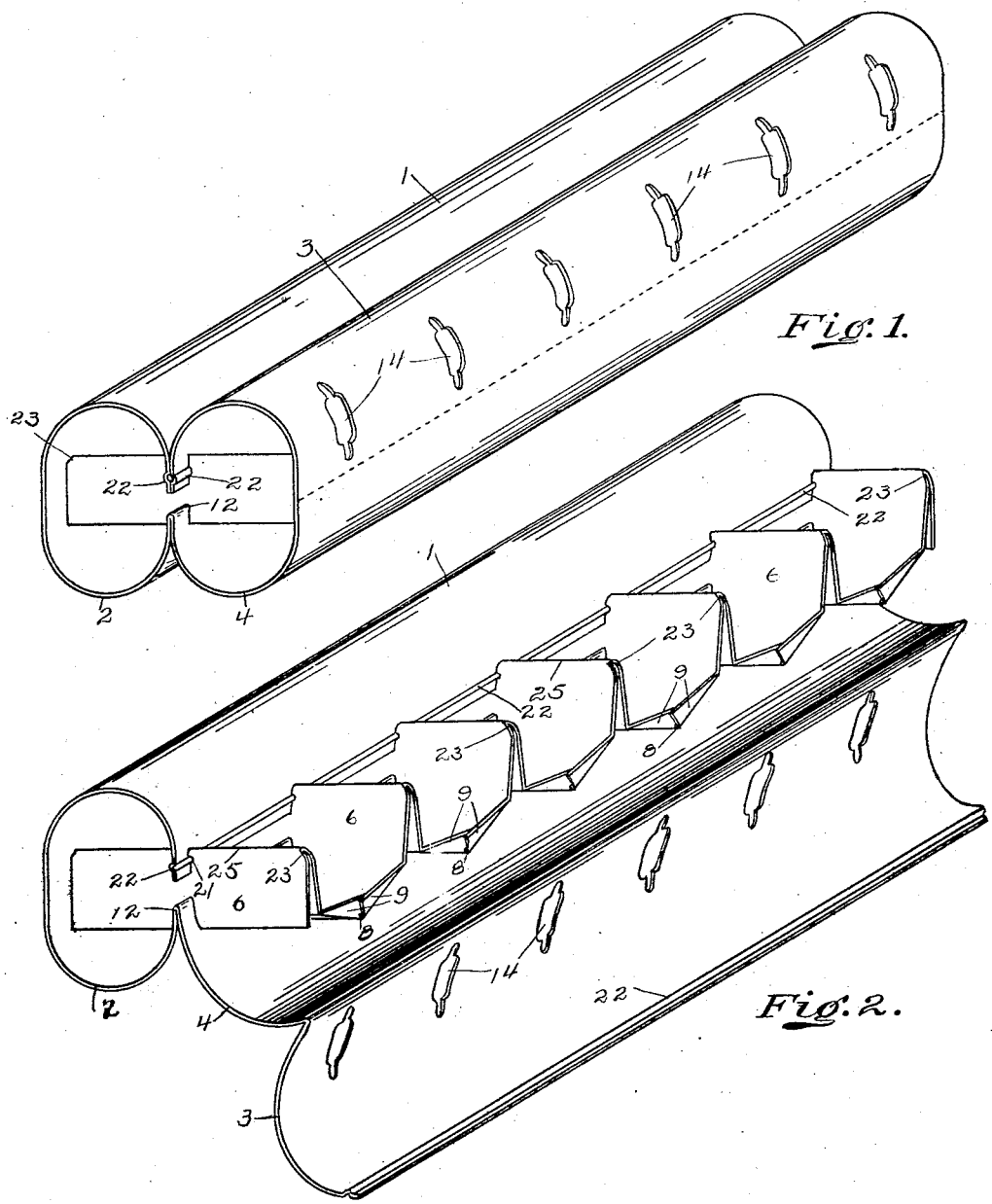

LOUIS A. DEGGINGER, OF COVINGTON, KENTUCKY, ASSIGNOR TO THE NO BREAK EGG CARRIER COMPANY, OF CINCINNATI, OHIO, A CORPORATION OF OHIO.

EGG-CARRIER.

1,144,111.

Specification of Letters Patent. Patented June 22, 1915.

Application filed December 26, 1914. Serial No. 879,133.

*To all whom it may concern:*

Be it known that I, LOUIS A. DEGGINGER, a citizen of the United States, residing in the city of Covington, in the county of Kenton and State of Kentucky, have invented certain new and useful Improvements in Egg-Carriers, of which the following is a specification.

My present invention is an improvement of the egg trays and locking device for the egg carrier in my former Patent #1,124,713 and also to use in connection therewith the unique candling means illustrated and claimed in said patent.

This new carrier is made for carrying one or several dozen eggs, and can be packed in the usual egg crate, so that the eggs can be sold and delivered to the retail purchaser in packages containing a dozen or more eggs. The eggs can also be placed in these carriers from a bulk supply and delivered to the purchaser at the final sales place or they can be placed in the carriers by the farmer or original source of supply, or they may be sent by mail.

One of the salient features of my invention consists in providing a unique and specially constructed egg tray which is suspended so the eggs will be held in the suspended tray and also be cushioned, thus cutting the breakage of eggs to a minimum.

Another feature of my invention consists in providing the body of this new carrier with slots or openings of peculiar shape and contour and placed in varying lines or positions with reference to the egg pockets in the egg tray, thus forcing or attaining a reflected light, so that the whole of the egg becomes visible for candling purpose and can thus be used for candling the eggs by the farmer, wholesaler, retailer or purchaser. They can, if desired, be refilled and any number of eggs candled.

Another feature and great advantage of the present egg carrier consists in providing an automatic lock for the body portion so that when filled it can be folded together and locked and can only be opened by manual means; except in case of accident.

My egg carrier is of unique construction and constructed so that it forms a structure which is braced from every point, thus retaining its original and normal positions and form. Its various other features and advantages will readily become apparent from the following specification.

In the accompanying drawing forming part of the specification, Figure 1, is an isometric view of the carrier, closed. Fig. 2, is an isometric view thereof with one side opened up and dropped down to illustrate the construction of the egg carrying tray. Fig. 3, is an isometric view of the egg carrier closed, and looking at it from the bottom. Fig. 4, is an end view of the carrier, closed. Fig. 5, is a longitudinal section taken on the line 5—5 of Fig. 3. Fig. 6, is a broken away plan view of part of the egg tray, as it appears when in position, and Fig. 7, is a plan or flat view of the egg tray, partly broken away, as it appears before being nested for the body portion.

The body of the egg carrier is composed of four semi-annular, elongated half tubes or sections, 1, 2, 3, 4, made from a sheet of card board or any suitable material.

The egg carrying tray 4' which fits into the body of the egg carrier is composed of a strip or strips of card board or the like, having central elongated eye shaped slots as 5, and at intervals bent up and folded to form a double wall 6 of an inverted V-shape in contour; between these walls 6 are formed the egg carrying pockets 7. At their outer edges the egg carrying pockets 7 are cut by a slot 8 and the folding edges 9 are turned up one overlapping the other at the bottom so as to form a double support for the eggs, the walls of the annular body portions 1 and 4 when in position pressing the folding edges 9 into a contour conforming to the shape thereof so that the egg will be cushioned, and the lower one of the edges forming a pier or bearing which first receives the shock and absorbs it, thus preventing said shock from reaching the egg; the egg on the inner side of the pockets being protected from injury by the peculiar slope of the carrier walls and the slots 10.

It will be noticed that the slots 8 are quite marked in degree of width, this prevents binding and allows play and enables the edges 9 to readily overlap.

The egg carrying tray 4' is supported in the body of the carrier by reason of the slots 5 passing over the inner meeting edges 12 of the body parts 2 and 4, so that said egg tray will be supported and suspended on said edges 12, an air space 13 being left at the bottom of the tray, between it and the body portions 2 and 3 so that the eggs will receive proper ventilation and also be cushioned by said air space.

The slots 5 are preferably rounded at their ends 20 so as to readily fit over the edge 12, and straddle the same.

The slots 10 are half rounded on one side, or may be of any other preferred shape or contour and are usually and preferably cut in the bottom of the carrier at the inner meeting edges 12 of the body parts 2 and 3 at a suitable distance from the top of edges 12, one slot being cut in each side of the edge 12 so as to provide a slot for each pocket.

In the outer body portions 1 and 4 opposite each egg pocket 7, at a point near the inner meeting edge of the carrier body parts 1 and 2 and 3 and 4, I place elongated slots as 14 formed widest at the middle and narrowed at the edges so as to form means for allowing light to enter over an extended space. These slots 10 and 14 are at the farthest points apart possible in the carrier on each side so that the entire egg can be properly candled. By looking through slots 10 the slots 14 being next to the light used for candling, a reflection of the rays of light is thrown throughout the whole egg pocket and around it so that the whole of the egg is visible and thus a satisfactory candling of the eggs results. It will be seen that the eggs can be candled by the farmer, wholesaler or commission house, the retailer or the consumer or by all of them, without removing the eggs from the egg carrier, making the candling of the eggs quick, thorough, convenient and highly satisfactory. These holes or slots can be of any desired shape or contour and placed at any part of the egg carrier found most desirable.

The egg carrier when empty can be refilled with eggs and used as a candling device until worn out.

In order that the egg carrying tray, will, when nested together in the body portion, fit the inner contour of the half sections 1 and 4 when they are folded, I form cutaway edges 23 at the line 25 which forms the apex of the folded sides 6—6 of the egg pockets when the tray is suspended in the body portion; this makes a snug fit and also prevents cutting of the body portion, which would result if the edges were sharp and not cut away.

A great desideratum in egg carriers is to hold or lock them in a closed position, so that they will not unfold, but remain in the normal packed position. This has been done by clasps, strings and other extraneous means, which are highly objectionable and readily get out of order and become untied, and in many cases, a folded flap is used which becomes loosened very readily. A great many eggs are broken because these egg carriers do not keep in the position in which they are intended to remain, and thus they become loosened and the eggs are broken. I overcome these objections by locking my egg carrier automatically, and when locked, it can only be opened by manual means or extra effort. To accomplish this end, I provide the egg carrying tray 4' with slots 15, which slots have side recesses 21, in the present instance two on each side thereof, the slots 15 extending on each side of the recesses 21, see particularly Fig. 7. When the egg tray is folded to form the egg pockets with the walls 6—6 the slots 15 and the recesses 21 are disposed similarly on each side of the apex 25 so that they form what might be termed double slots and double recesses. To further carry this locking device into effect I form at the outer edges of the folding halves 1 and 4 ribs or ridges 22, which ribs when the egg tray is suspended in the body portion are forced into the slots 15 and when said ribs reach the double recesses 21 they automatically pass into said recesses on account of the spring in the curvature of the half sections 1 and 4, and in this position the parts remain, as the ribs 22 can not leave the recesses as they are firmly held therein and locked against displacement of any kind, and the half sections 1 and 4 can not be opened except by manual means and then only by an extra effort. The case will remain locked and in a normal position under all conditions from the time of original packing until final delivery. This peculiar lock therefore, by holding the covering sections 1 and 4 in the thoroughly dependable position adds greatly as a preventive in breaking the eggs.

The slots 15 and recesses 21 may be of any desired shape or contour, and the rib 22 may be broken at intervals and not continuous, the main object being to provide some kind of a slotted recess in an egg tray into which a rib, projection or protuberance as 22 may fit to form a lock.

The egg pockets 7, by the peculiar formation of the parts forming them, support the eggs in a suspended position under which are air pockets, thus the eggs ride in safety and can be handled with less care, the breakage being consequently cut down to a minimum.

The egg carrier is very quickly packed and can readily be placed in the shipping crate to take the place of the usual "flats and fillers" now used, and can be handled with great convenience by the retailer and having a peculiar combined degree of stiffness and flexibility can be handled by the consumer with ease and pleasure and with satisfactory results.

It will readily become apparent that the combination of the body portion with the peculiar shaped slots and their distribution as set forth herein, with the suspended egg tray and the automatic locking of the carrier, form an egg carrier of the highest efficiency and cut the breakage of eggs to a minimum.

I usually permeate the body of the carrier and the egg tray or either of them with water glass, silicate of soda, or other water proofing substance, which keeps insects and vermin from the eggs, keeps them and the case in a sanitary and wholesome condition and affords a pleasant touch when the egg carrier is handled.

While I have described and shown one specific form of egg carrier, it will readily be apparent that various modifications of the same can be made, without departing from the spirit or principle of the invention, and I wish to be understood that such modifications will fall within the scope of my invention.

What I claim as new and my invention, and desire to secure by Letters Patent is:

1. In an egg carrier of the class described, a body portion made of a series of half sections joined together, and capable of being folded together, an egg carrying tray, said egg carrying tray connected to the body portion, the outer half sections of the body portions each provided with a rib and the egg carrying tray provided with engagement slots, whereby, when the two outer half sections are folded to close the carrier, the ribs will automatically enter said engagement slots and lock the body and egg carrying tray together.

2. In an egg carrier of the class described, a body portion made of a series of half sections joined together, and capable of being folded together, an egg carrying tray, said egg carrying tray supported in the body portion, the outer half sections of the body portion each provided with a rib, and the egg carrying tray provided with vertical slots having laterally disposed recesses, whereby, when the two outer halves are folded to close the carrier, the ribs will enter and become interlocked with said laterally disposed recesses.

3. In an egg carrier of the class described, a body portion comprising a series of half sections capable of being folded together, an egg carrying tray supported therein and combined therewith, the two outer halves of the body portion provided near their outer edges with ribs embossed therein and the tray portion provided with engaging slots, so that when the carrier is folded and closed the ribs on the outer halves of the body portion will engage the slots in the tray portion and become interlocked therewith.

LOUIS A. DEGGINGER.

Witnesses:
H. E. CARSTENS,
L. M. DUNLAP.